(12) United States Patent
Brusatore

(10) Patent No.: US 9,010,022 B2
(45) Date of Patent: Apr. 21, 2015

(54) VERTICAL METHOD AND APPARATUS FOR GROWING PLANTS

(75) Inventor: Nicholas Gordon Brusatore, Port Moody (CA)

(73) Assignee: Terrasphere Systems LLC, Boston, MA (US)

( * ) Notice: Subject to any disclaimer, the term of this patent is extended or adjusted under 35 U.S.C. 154(b) by 780 days.

(21) Appl. No.: 13/137,564

(22) Filed: Aug. 26, 2011

(65) Prior Publication Data
US 2012/0060416 A1    Mar. 15, 2012

Related U.S. Application Data

(60) Provisional application No. 61/344,673, filed on Sep. 9, 2010.

(51) Int. Cl.
*A01G 31/06*    (2006.01)

(52) U.S. Cl.
CPC ...................... *A01G 31/06* (2013.01)

(58) Field of Classification Search
CPC ....... A01G 31/02; A01G 31/04; A01G 31/06; A01G 9/022; A01G 9/023; A01G 9/088
USPC .................. 47/1.01 R, 17, 58.1 R, 65, 82, 83
See application file for complete search history.

(56) References Cited

U.S. PATENT DOCUMENTS

| | | | |
|---|---|---|---|
| 3,254,448 A * | 6/1966 | Ruthner | 47/65 |
| 3,314,192 A | 4/1967 | Park | |
| 3,339,308 A | 9/1967 | Clare | |
| 3,664,063 A | 5/1972 | Ware | |
| 3,906,667 A | 9/1975 | Williams | |
| 3,909,978 A * | 10/1975 | Fleming | 47/82 |
| D237,898 S | 12/1975 | Austin | |
| 4,068,405 A | 1/1978 | Campbell et al. | |
| 4,085,544 A * | 4/1978 | Blake | 47/39 |
| 4,163,342 A | 8/1979 | Fogg et al. | |
| 4,170,844 A * | 10/1979 | Steele | 47/62 R |

(Continued)

FOREIGN PATENT DOCUMENTS

| | | |
|---|---|---|
| JP | 11-289872 | 10/1999 |
| WO | WO2006/096650 A2 | 9/2006 |

(Continued)

OTHER PUBLICATIONS

PCT International Search Report and the Written Opinion in International App. No. PCT/US11/01507 dated Dec. 22, 2011 (8 pp.).

(Continued)

*Primary Examiner* — Monica Williams
(74) *Attorney, Agent, or Firm* — Dinesh Agarwal, P.C.; John E. Lynch, Esq.

(57) ABSTRACT

Method and apparatus for growing plants in vertical stacks by providing vertically stacked, interconnected pairs of plant platforms and light trays carrying growth promoting light sources. Each light tray is suspended below the underside of the next above plant platform. The stack is vertically raised in succession whereby the plant platforms are suspended and vertically spaced from each other. Thereafter, plants are placed between suspended platforms under the light trays which are regulating during periods of plant growth and non-growth.

12 Claims, 10 Drawing Sheets

(56) References Cited

U.S. PATENT DOCUMENTS

| | | | |
|---|---|---|---|
| 4,216,617 A | 8/1980 | Schmidt | |
| 4,276,720 A | 7/1981 | Lyon | |
| 4,317,308 A * | 3/1982 | Derrick et al. | 47/1.1 |
| 4,332,105 A * | 6/1982 | Nir | 47/1.01 R |
| 4,514,929 A | 5/1985 | Lestraden | |
| 4,521,989 A | 6/1985 | Meyer | |
| 4,713,909 A | 12/1987 | Roper et al. | |
| 4,813,176 A | 3/1989 | Takayasu | |
| 5,042,196 A | 8/1991 | Lukawski | |
| 5,555,676 A | 9/1996 | Lund | |
| 5,673,511 A | 10/1997 | Holtkamp, Jr. | |
| 5,826,375 A | 10/1998 | Black | |
| 5,943,818 A * | 8/1999 | Fruehwirth | 47/65 |
| 5,987,812 A | 11/1999 | Knell | |
| 6,243,985 B1 | 6/2001 | Miller | |
| 6,279,263 B1 | 8/2001 | Lai | |
| 6,598,339 B1 | 7/2003 | Bish et al. | |
| 6,612,073 B1 | 9/2003 | Powell et al. | |
| 6,854,209 B2 | 2/2005 | Van Horssen et al. | |
| 7,055,282 B2 | 6/2006 | Bryan, III | |
| 7,415,796 B2 | 8/2008 | Brusatore | |
| 7,516,574 B2 | 4/2009 | Gottlieb et al. | |
| 7,533,493 B2 | 5/2009 | Brusatore | |
| 7,559,173 B2 | 7/2009 | Brusatore | |
| 7,818,917 B2 | 10/2010 | Brusatore | |
| 8,151,517 B2 * | 4/2012 | Emoto | 47/60 |
| 8,151,518 B2 * | 4/2012 | Adams et al. | 47/82 |
| 8,533,993 B2 * | 9/2013 | Pettibone | 47/65 |
| 2006/0196118 A1 | 9/2006 | Brusatore | |
| 2006/0230674 A1 | 10/2006 | Marchildon | |
| 2007/0144069 A1 | 6/2007 | Gottlieb et al. | |
| 2007/0251145 A1 | 11/2007 | Brusatore | |
| 2008/0000152 A1 | 1/2008 | Shouse et al. | |
| 2008/0110088 A1 | 5/2008 | Brusatore | |
| 2008/0216403 A1 | 9/2008 | Schmidt et al. | |
| 2008/0263949 A1 | 10/2008 | Early | |
| 2009/0000189 A1 | 1/2009 | Black | |
| 2009/0119987 A1 | 5/2009 | Ingrassia | |
| 2009/0301979 A1 | 12/2009 | Tanaka et al. | |
| 2009/0307973 A1 | 12/2009 | Adams et al. | |
| 2010/0236147 A1 | 9/2010 | Brusatore | |
| 2011/0120002 A1 * | 5/2011 | Pettibone | 47/65 |

FOREIGN PATENT DOCUMENTS

| | | |
|---|---|---|
| WO | WO2008/156538 A1 | 12/2008 |
| WO | WO2010/110844 A1 | 9/2010 |

OTHER PUBLICATIONS http://www.hg-hydroponics.co.uk/vertical-growing-systems-85-c.asp (2 pp.). Accessed Jun. 12, 2009.

easyhydroponics.net article 2007-2008 (Google) (2 pp.).

* cited by examiner

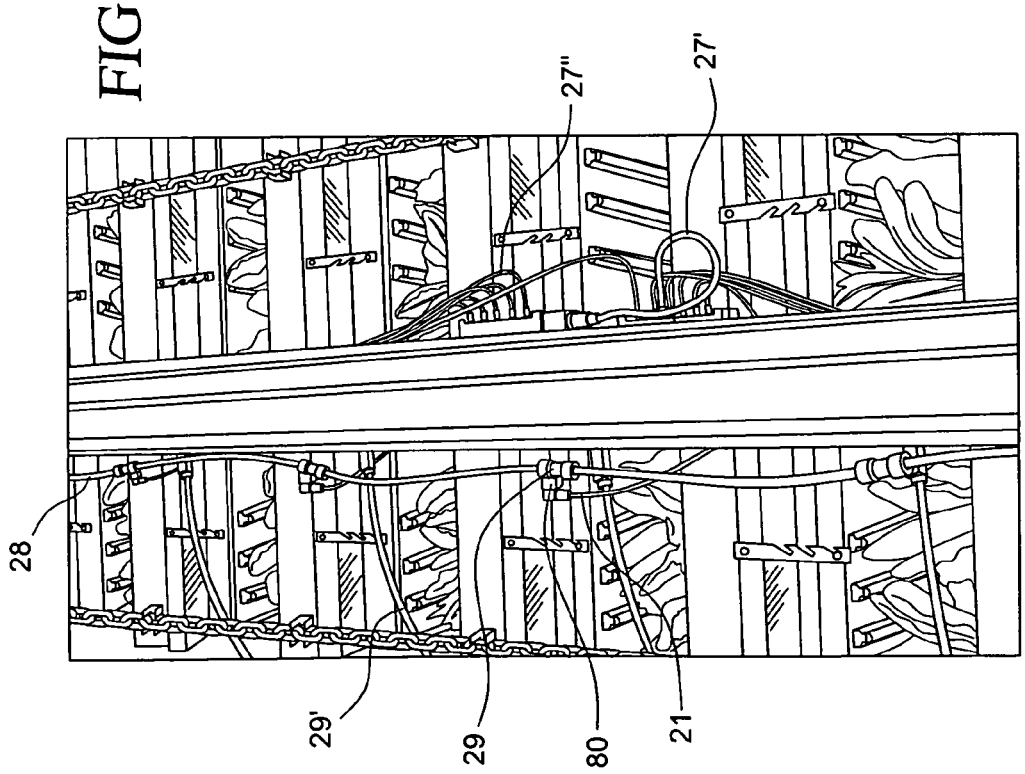
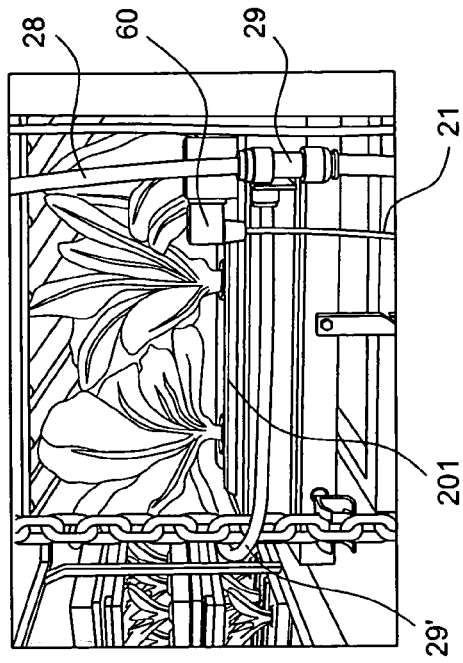
FIG. 6A
FIG. 6B

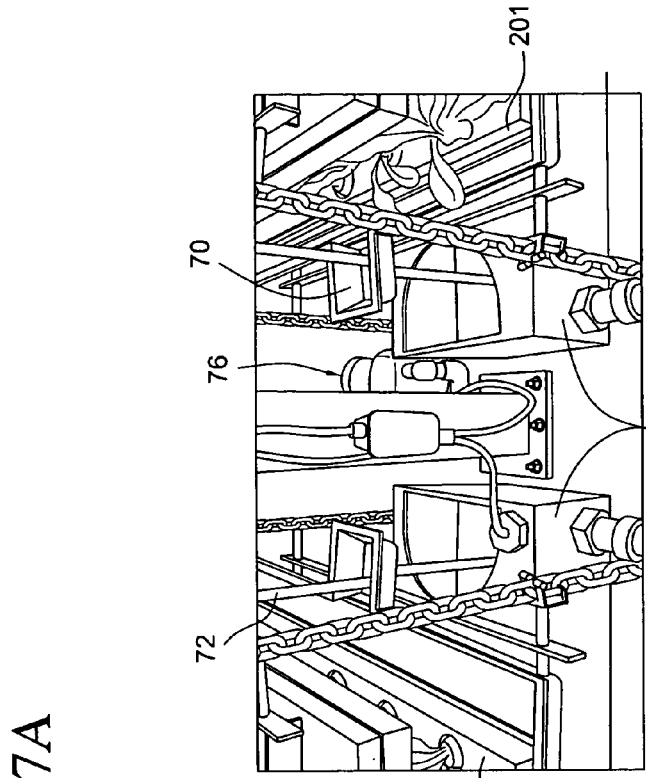

VERTICAL METHOD AND APPARATUS FOR GROWING PLANTS

CROSS-REFERENCE TO RELATED APPLICATIONS

The present application claims priority on prior U.S. Provisional Application Ser. No. 61/344,673, filed Sep. 9, 2010, which is hereby incorporated herein in its entirety by reference.

FIELD OF THE INVENTION

This invention relates to growing plants in vertical stacks of pairs of plant platforms and light sources which when suspended provide space to receive seeds for germination and/or seedlings and plants to be grown.

SUMMARY OF THE INVENTION

The invention provides a method for growing plants in vertical stacks which includes the steps of: (i) providing vertically stacked horizontal pairs P of plant platforms with inverted light trays resting thereon, each light tray carrying growth promoting light sources; (ii) vertically raising the uppermost light tray a desired growing distance S above the uppermost plant platform; (iii) vertically raising the uppermost plant platform with the next-below light tray suspended thereunder a desired growing distance S above the next upper platform; (iv) repeating step (iii) in succession whereby a series of platforms with light trays suspended thereunder are vertically suspended and spaced a desired growing distance S from each other; and (v) adjusting the growing distance S to accommodate plant growth without re-suspending plant platforms by adjustably suspending the uppermost light tray and adjustably suspending the lower light trays from the plant platforms.

The invention also provides vertical apparatus for growing plants which includes: (i) a plurality of vertically stacked pairs P of plant platforms with inverted light trays resting thereon, each light tray carrying a growth promoting light source; (ii) means to vertically raise the uppermost light tray a desired growing distance S above the uppermost plant platform; (iii) means to vertically raise, in succession, the uppermost plant platform and each next below plant platform, each with the next-below light tray suspended thereunder, a desired growing distance S whereby a series of plant platforms with light trays suspended thereunder are vertically suspended and spaced a desired growing distance S from each other; and (iv) means to adjust the growing distance S to accommodate plant growth without re-suspending plant platforms by adjustably suspending the uppermost light tray from the means to vertically raise the uppermost light tray and adjustably suspending successively lower light trays from the plant platforms.

In a preferred embodiment plants to be grown are carried on plant trays which rest on watering tray and are watered aeroponically.

BRIEF DESCRIPTION OF THE DRAWINGS

The following drawings show preferred embodiments and are not intended to restrict or otherwise limit the invention in any way. All known functional equivalents of components or elements disclosed or shown herein are within the intent and scope of the invention.

FIGS. 6A-B are end views showing Romaine lettuce growing according to the invention.

FIGS. 7A-B are opposite end views from FIG. 6 showing a water drainage arrangement.

DESCRIPTION OF PREFERRED EMBODIMENTS

Figure 1A:
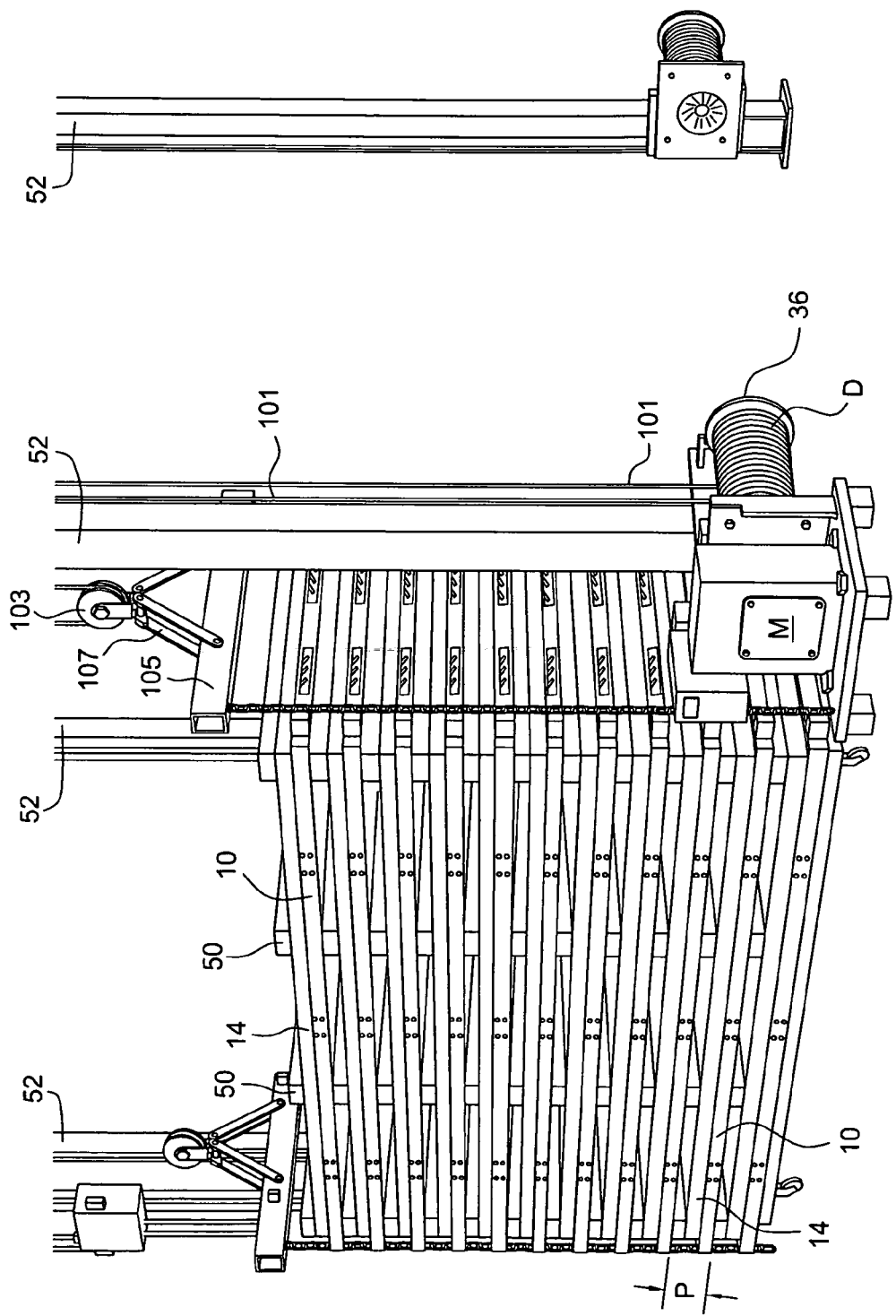
FIG. 1A is a perspective front view of a stack for growing plants showing stacked tray pairs.
Figure 1B:
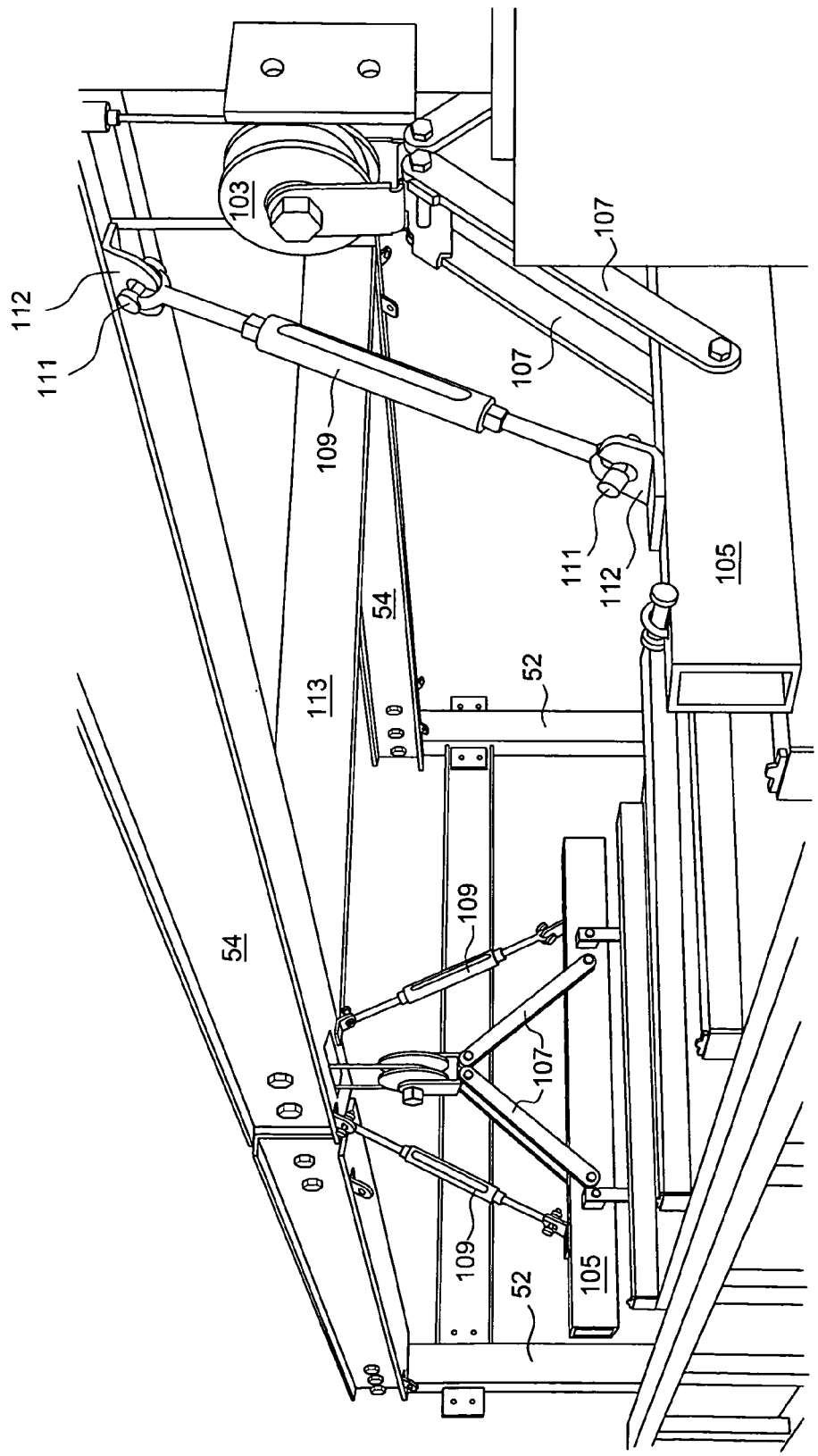
FIG. 1B is a perspective front view of the stack shown in FIG. 1A showing detail of the upper portion of the stack.
Figure 2:
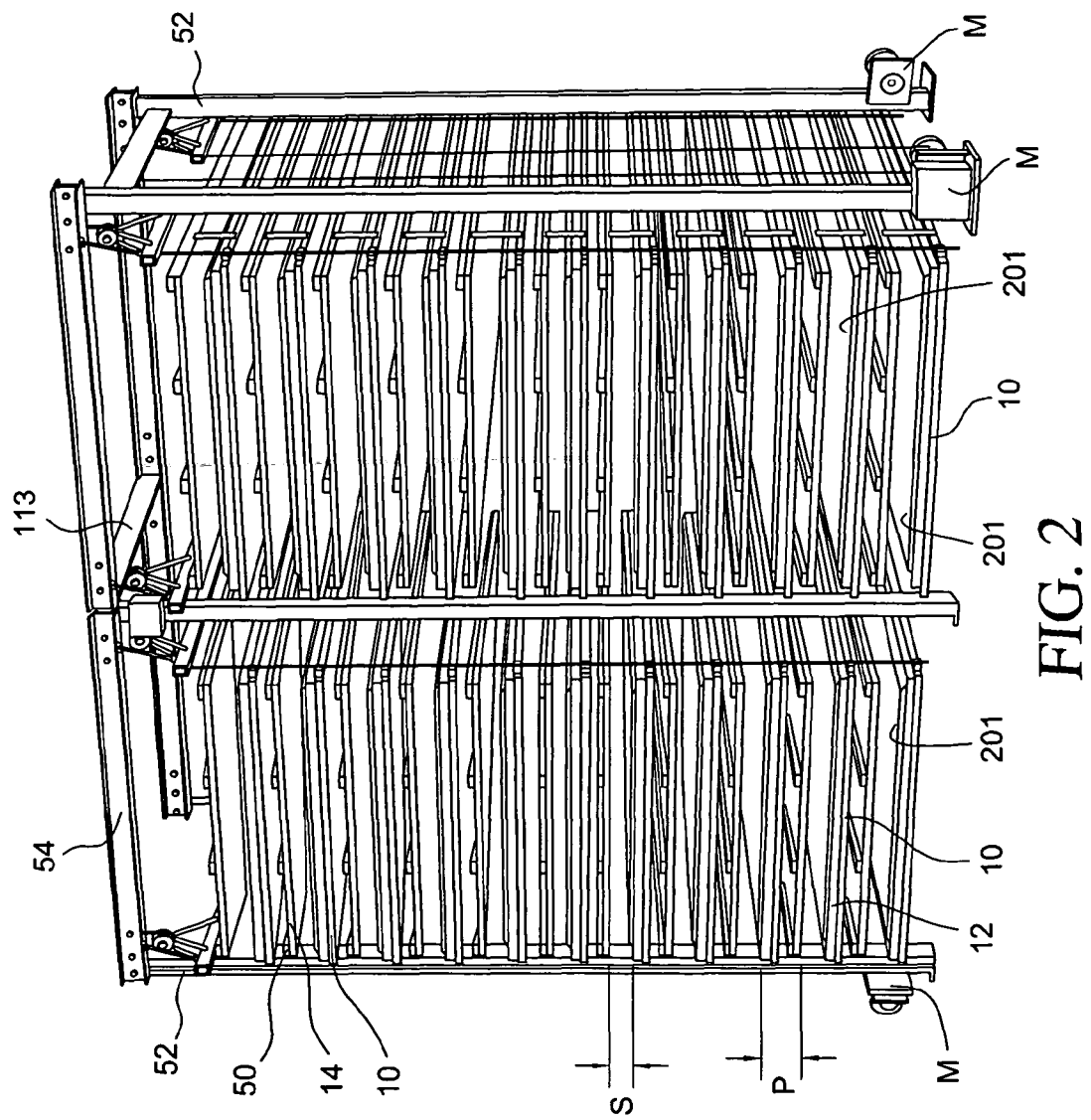
FIG. 2 is a perspective front view of vertical stacks for growing plants showing tray pairs raised to a growing position; the view shows four stacks as shown in FIG. 1A, raised to a growing position.
Figure 3:
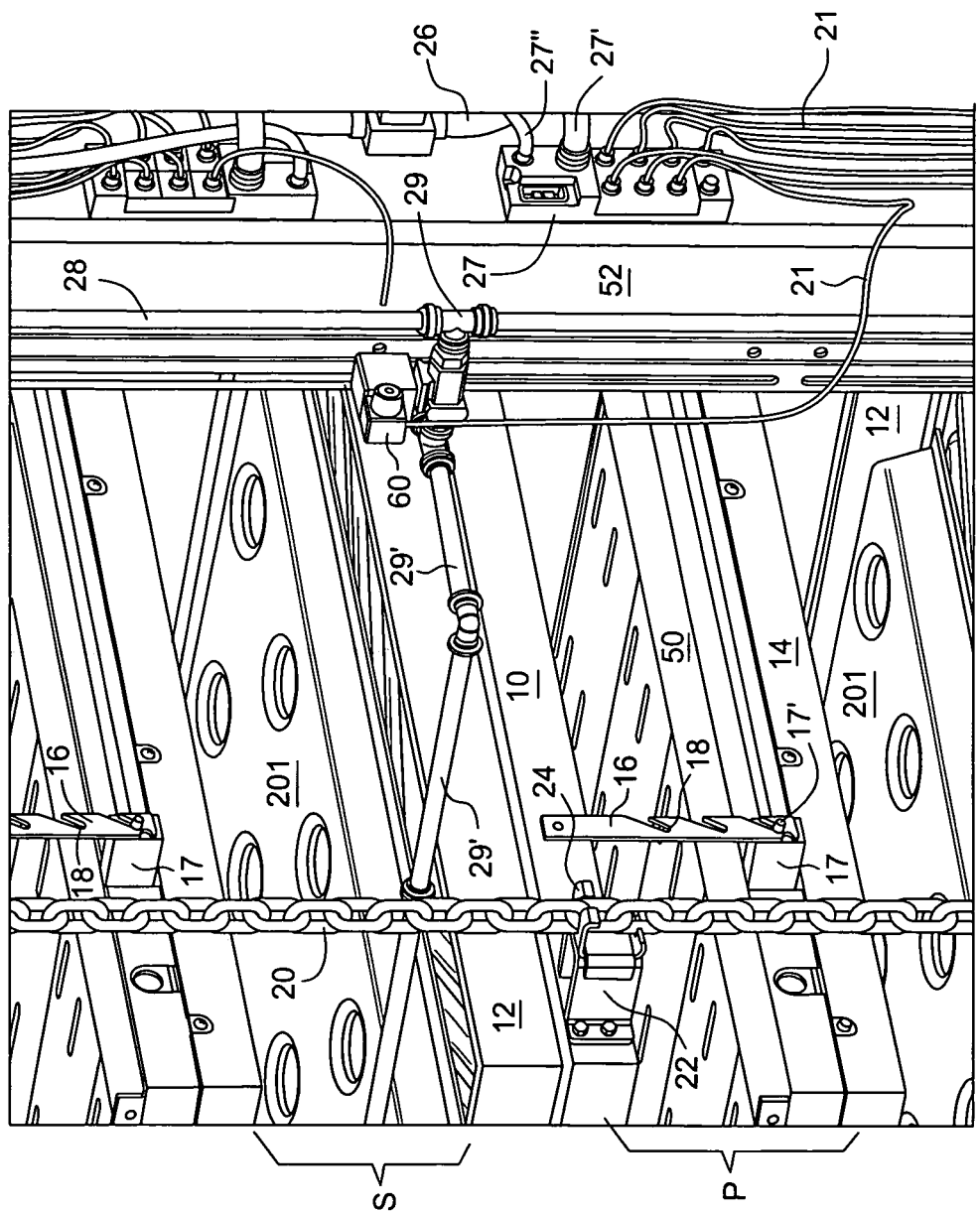
FIG. 3 is an enlarged detail view of a portion of one end of a stack shown in FIG. 2.

As shown in FIGS. 1-3, a preferred embodiment of vertical apparatus for growing plants includes a plurality of vertically stacked pairs P of plant platforms 10 and inverted light trays 14 that rest on each platform 10. Watering trays 12 rest on platforms 10. Alternatively, light trays 14 can nest within the trays 12 to conserve space. Platforms 10 are generally an open frame construction of L-angled aluminum members of suitable strength to support watering trays 12 and a full load of mature plants ready for cropping.

Each light tray 14 carries downwardly facing growth promoting light sources such as banks of fluorescent tubes 50 (FIGS. 3 and 7A). Each light tray 14 is adjustably suspended from the underside of the next above platform 10 by brackets 16 with slots 18 attached at the ends of each platform 10 which engage tabs 17' carried by blocks 17 at the ends of each tray 14.

Each pair P of platform 10 and light tray 14 are suspended from each other a desired growing distance S by chain 20 which engages bifurcated member 24 mounted on bracket 22 at the ends of each platform 10. The growing distance S can be adjusted by raising or lowering light tray 14 via brackets 16 to engage any of slots 18 without having to re-suspend platforms 10. In other words, once an initial space S is chosen and chain 20 is engaged by member 24 to define that spacing, the growing distance can be adjusted by moving light tray 14 up or down via bracket 16 and slots 18 without changing the chain distance between plant platforms 10.

Motors M via cable spools 36, pulleys 103 and cables 101 vertically raise the pairs P in succession thus creating space S which can accommodate watering trays 12 below each light tray 14.

Pulleys 103 are suspended from a frame comprising vertical supports 52 and horizontal support members 54 and 113. Pulleys 103 are mounted on cross member 105 via braces 107 (FIG. 1B). The upper ends of chain 20 are attached to members 105 and are raised together from the fully collapsed position shown in FIG. 1A to the fully expanded growing position shown in FIG. 2. As shown in FIG. 1B, the uppermost light tray 14 is adjustably suspended from cross members 105 by brackets 16 and slots 18 in the same fashion as lower trays 14 are adjustably suspended from plant platforms 10; Turn-buckles 109 are attached to horizontal members 54 and cross members 105 via tabs 112 and bolts 111 and serve to hold each raised stack in the growing position and take the tension off pulleys 103.

Looking at FIGS. 4-7, watering trays 12 are inserted into spaces S and rest on platforms 10. Trays 12 and can receive a series of easily handled side-by-side perforated plastic planting trays (like ice-cube trays), each holding plants in peat plugs, for example. In one embodiment, growing is staged using plant lids as shown for example in FIGS. 4 and 5. In FIG. 2, side-by-side plant lids 201 rest on trays 12 and can easily be inserted and removed therefrom.

Thus plants can be grown hydroponically using perforated plant trays sitting on watering trays 12. In this case, water is fed to each tray 12 and contacts plant roots held in each plant tray. The top of the plants can also be misted in this embodiment. In a preferred embodiment, plants carried by lids 201 are watered aeroponically, with or without misting the tops of plants, by intermittently spraying water under each lid as is more full described herein.

Figures 4A, 4B:
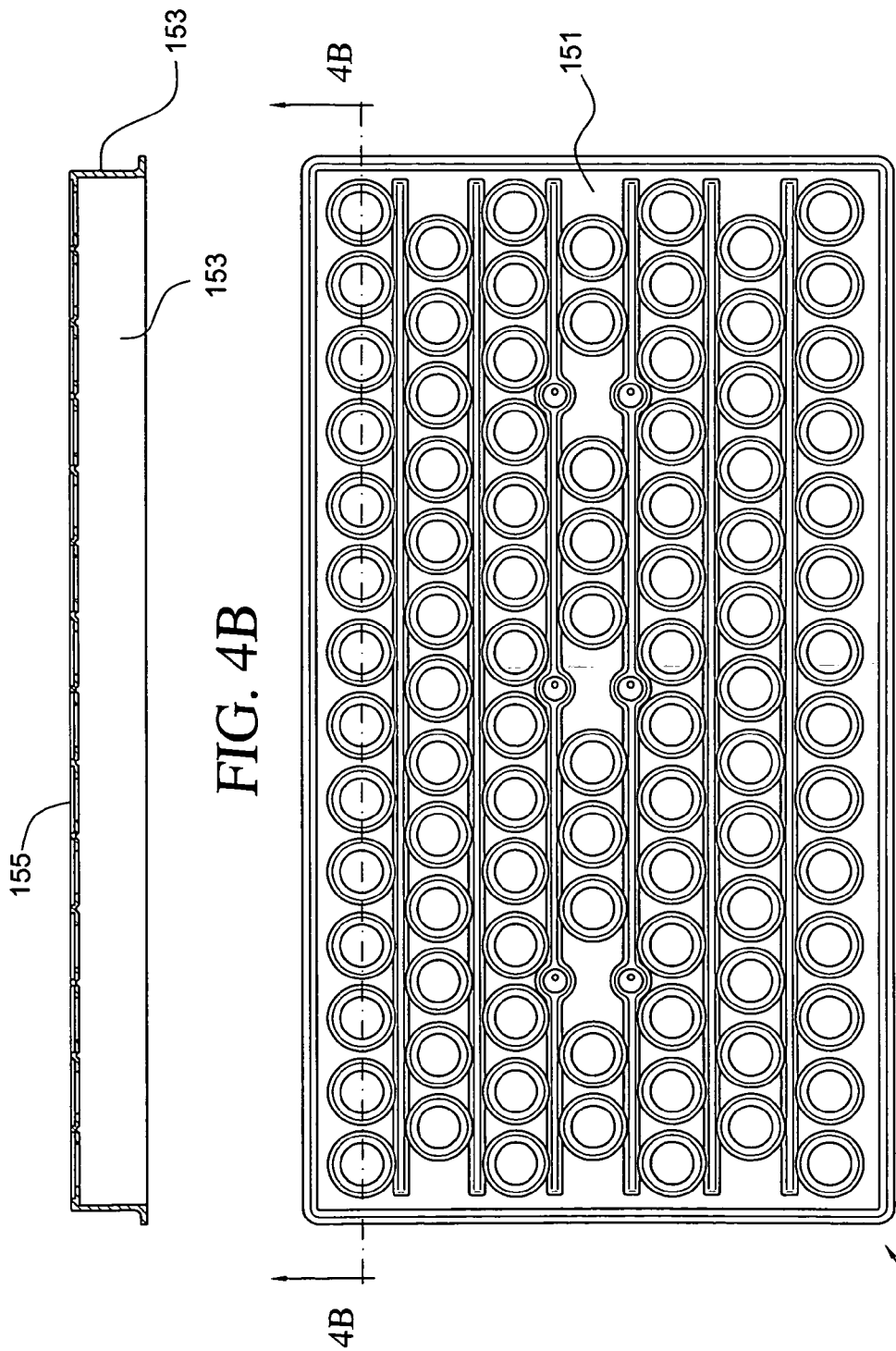
FIGS. 4A-D are views of plant holding trays for a growth stage of plants.
Figure 4D:
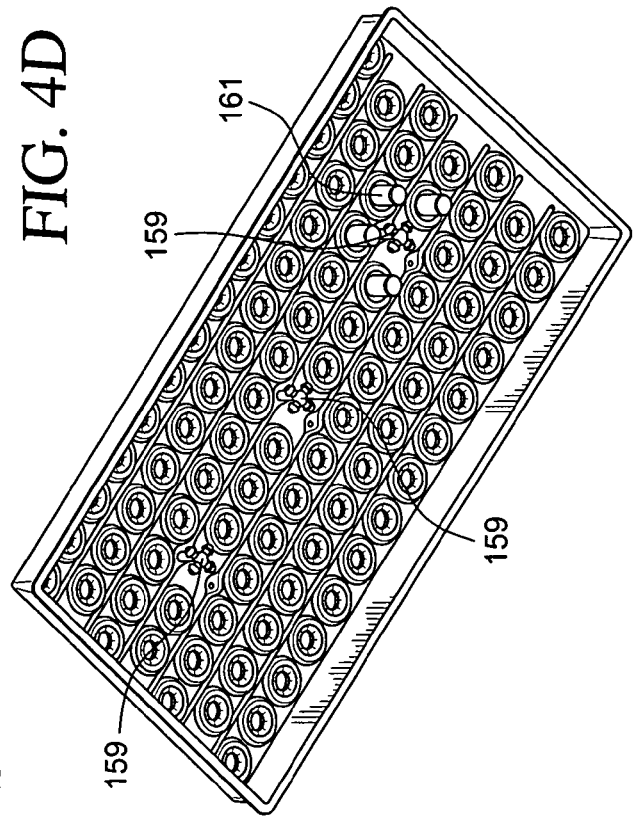
Figure 4C:
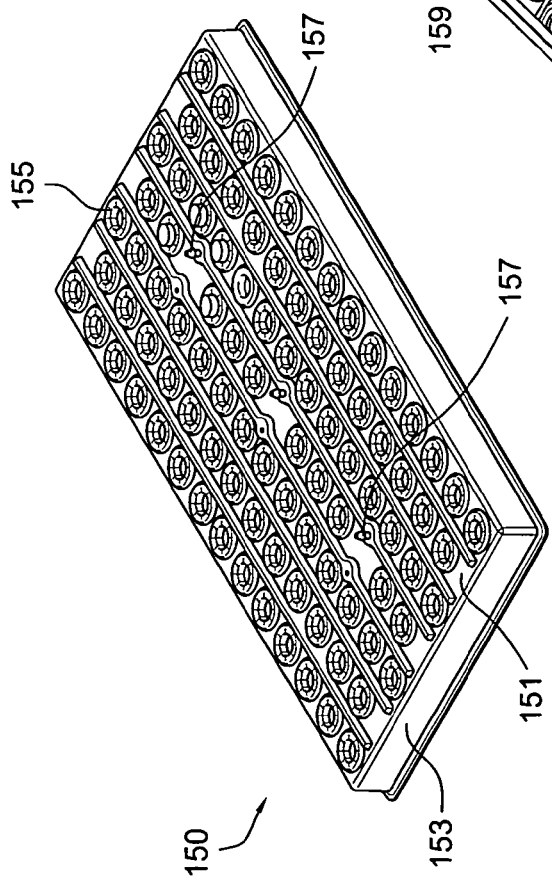
Figure 5B:
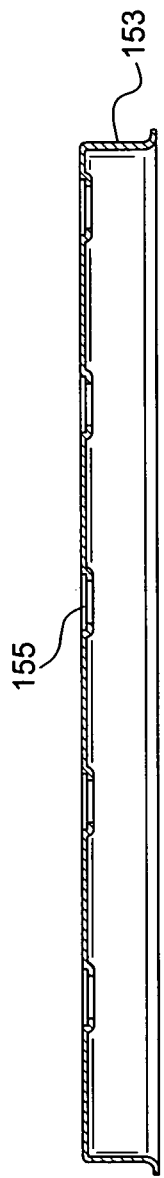
FIGS. 5A-D are views of plant holding trays for another growth stage of plants.
Figure 5A:
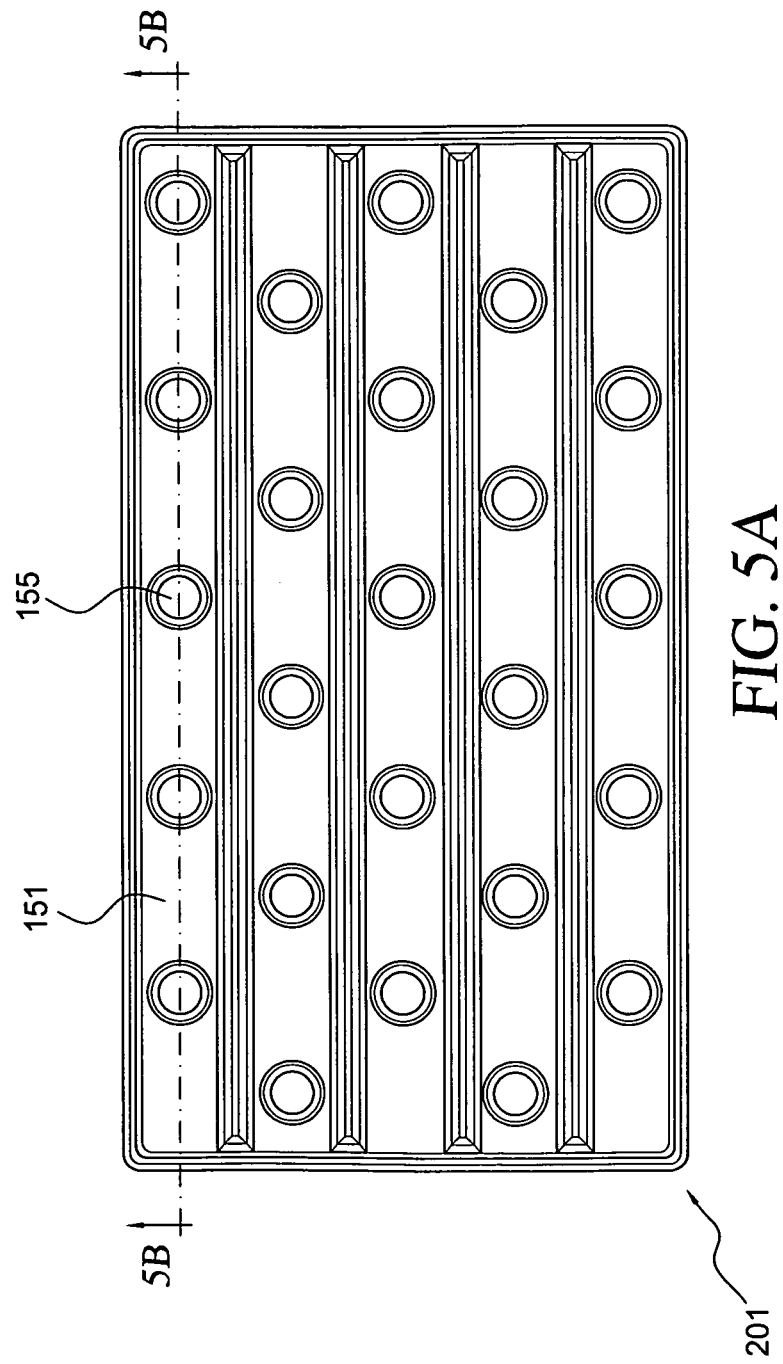
Figure 5D:
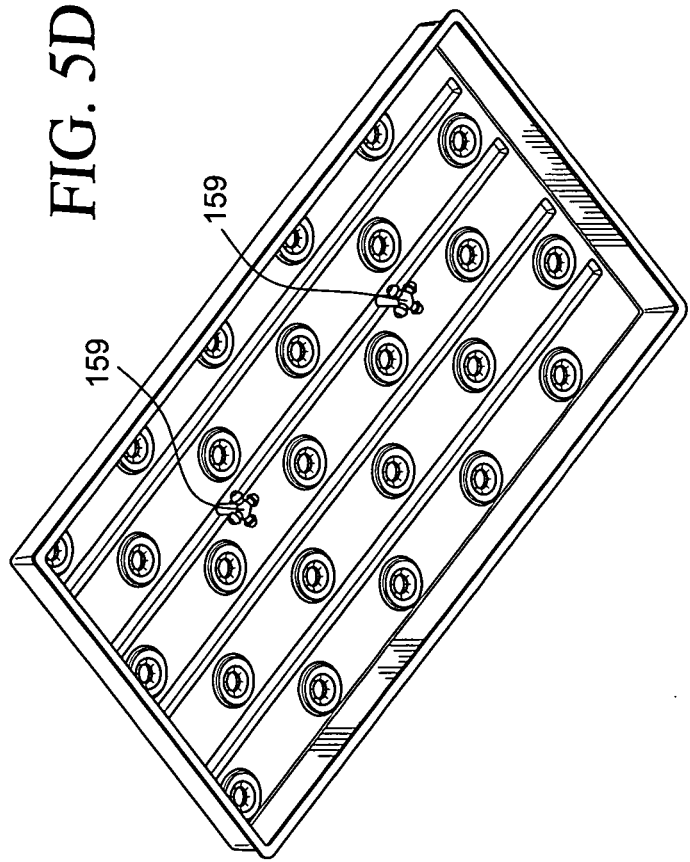
Figure 5C:
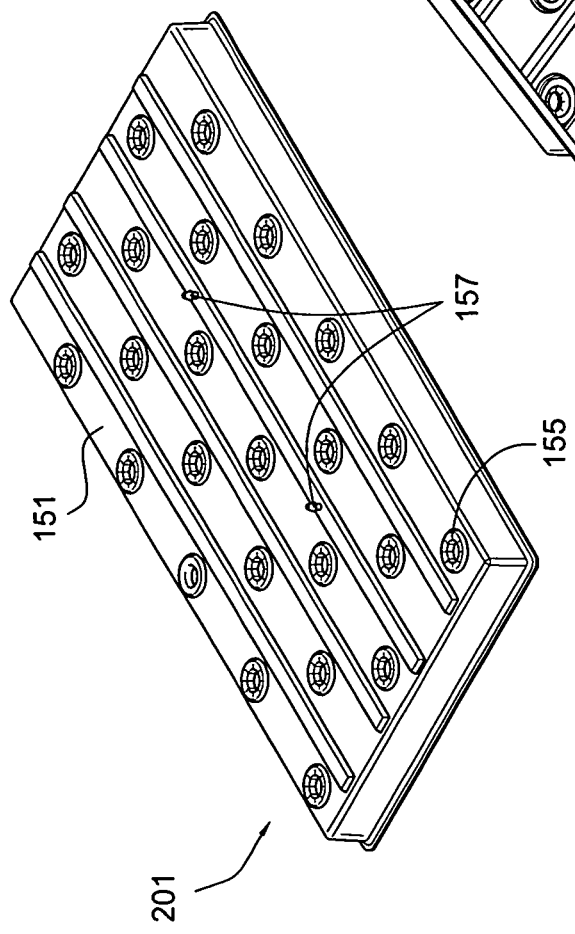

Plant lids 201 comprise a top 151 with resilient plant holding apertures 155 and side walls 153. FIGS. 4 and 5 differ by the number of plant holding apertures 155, the FIG. 4 lid being used for the growth of juvenile plants and the lid of FIG. 5 for the final growth of mature plants. Space S can be adjusted via brackets 16 and slots 18 for optimum growth during either stage. Increasing the space S may also reduce the number of pairs P that can be used for growing in a given stack.

Power lines 80 (FIG. 7A) deliver power to illuminate light sources 50 during periods of plant growth. Means such as computer controlled timers, well known in the art, are provided to regulate light sources 50 during periods of growth and non-growth.

Looking at FIGS. 6A and 6B, water and plant nutrients are delivered to plant lids 201 via main water line 28, T-connectors 29 and lines 29' which feed water via solenoid valves 60 for plant growth to each lid 201. Main line 28 is connected to a temperature controlled water reservoir which can contain nutrients as needed. Water is preferably filtered and watering times are regulated by signals sent to solenoids 60 from computerized controllers as is well know in the art. Power block 27 distributes power and signals from line 27' to each solenoid 60 via individual lines 21 (FIGS. 3 and 7A). Bridge line 27" gangs two distribution blocks 27 for tandem operation. See FIGS. 6A-B.

Looking at FIGS. 4C-D and 5C-D, water lines 29' are connected along each set of side-by-side lids 210 on each tray 12 and feed water to connectors 157 located on the top of the lids which in turn feed 360 degree spray heads 159 located on the underside of the trays via T-joints and lines running at right angles from line 29' to aeroponically provide moisture to plant carrying peat pucks held in apertures 155 extending into the space below each plant lid 201. See FIGS. 6B and 7A. This is preferred because it requires less water to feed growing plants. Excess water that collects in trays 12 drains off by slightly tilting trays 12 (one or two degrees is generally sufficient) towards one end of the apparatus. See FIG. 7A-B wherein tray extensions 70 collect excess water which is gravity fed via tubes 72 from one tray 12 to the next below, and so on, to holding tanks 74. Pump 76 recirculates excess water to a holding tank which feeds main water line 28.

It is preferred to use a series of stages for growing crops according to the invention. Stage one involves seed germination in peat pucks under conditions of high humidity using humidity domes, for example. Sprouted seedlings are then grown to juvenile stage after removing humidity domes. Juvenile plants in peat pucks are inserted in holding apertures 155 in lids 201 (FIG. 4) and placed on trays 12 in space S for further growth. When juvenile plants begin to crowd each other, they are thinned by removing every other plant puck and inserting the thinned plants into spaced apertures 155 in lids 201 (FIG. 5).

Alternately, plant lid 201 can have a single distribution of plant apertures 155 with appropriate spacing to grow plants from insertion into the vertical farm through harvest without changing the number of plants in each lid.

Once pairs P are suspended as described herein, in a preferred embodiment, a hydraulic man-lift, or similar device, is used to place lids 201 with young plants on trays 12, adjust space S during the growing cycle and to remove lids 201 with mature plants from cropping. Watering trays 12 can be removed after cropping for washing or other maintenance and then replaced on suspended platforms 10.

When pairs P require maintenance after several growing cycles, motor M is reversed to lower platforms 10 in succession. Pairs of light trays 14 and platforms 10 and then are re-stacked to the position shown in FIG. 1A. A stack of pairs P can rest on a wheeled dolly (see FIG. 1A) for ease of movement for maintenance, cleaning etc. after disengaging chain 20.

Alternatively, platforms 10 can be raised and lowered in sequence at a work station in which plant are inserted and removed. The location of the work station will normally at a comfortable height for workers to handle plant trays.

In operation, a preferred method for growing plants includes:
a) providing vertically stacked pairs P of platforms 10 with inverted light trays 14 resting thereon, each light tray 14 carrying growth promoting light sources 50;
b) vertically raising the uppermost light tray 14 a desired growing distance S above the uppermost platform 10;
c) vertically raising the uppermost platform 10 with the next-below light tray 14 suspended thereunder a desired growing distance S above the next upper platform 10;
d) repeating step c) in succession whereby a series of platforms 10 with light trays 14 suspended thereunder are vertically suspended and spaced a desired growing distance S from each other via chain 20 (FIG. 2);
e) placing watering trays 12 on each suspended platform 10;
f) placing plant lids 210 with plants to be grown in space S on suspended trays 12 under the light trays 14;
g) regulating the light sources during periods of plant growth and non-growth;
h) supplying water to lids 210 for plant growth; and
i) removing plant lids 201 containing grown plants for cropping from space S.

Of particular advantage is the ability to accommodate plant grown during the growing cycle without re-suspending pairs P. This is done using brackets 16 and slots 18 to move the light trays up and down to change the growing distance S without changing the chain distance between plant platforms 10.

Light trays 14 delivers growth promoting UV light during selected intervals to the plants growing in watering trays 12. The light source can be a fluorescent tube or tubes, a light emitting diode (LED), a high pressure sodium lamp, other metal halide lamps or an ordinary light bulb or bulbs.

LEDs allow remote control of the spectrum of light to accommodate and control specific stages of plant growth and development. LEDs draw approximately 25% less power than fluorescent lamps. This makes the use of solar power feasible which is especially beneficial in remote regions.

Basil grown from seed and safflower seeds grown from seedlings are examples of plants that can be grown in high yields according to the invention. The invention is especially suited for growing leafy green vegetables, tomatoes, fruits and berries such as strawberries and cutting flowers. The following is a representative list of crops that can be grown according to the invention:

Herbs

Aloe Vera
Artemisia—Artemisia annua
Basil—Ararat basil—Green Globe Basil—Sweet Salad Basil—Thai Basil
Cilantro—Spice Coriander—Santo Cilantro
Echinacea—Echinacea purpurea
Eucalyptus—Eucalyptus globulus—Peppermint Eucalyptus
Funnel
Golden seal
Lemon balm
Milk Thistle
Oregano—Greek Oregano—Italian Oregano—Mexican Oregano
Paprika—Capsicum annuum
Parsley—Aphrodite parsley—Italian Parsley—Plain parsley
Peppermint
Chile Pepper—Habanero—Jalapeno—Tabasco—Scotch Bonnet—Cayenne
Sage—Extrakta Sage—Garden Sage
St. Johns Wart
Yucca—Yucca glauca Vegetables Beans—Golden Wax—Tender green
Broccoli—De Cicco
Cauliflower—Snowball
Lettuce—Butterhead—Loose leaf—Oak leaf Red—Romaine
Spinach—Mustard—New Zealand
Peppers—Cal wonder—Golden Cal Wonder—Sweet Chocolate—Jamaican
Yellow
Tomato—Roma—Sweetie—
Pea—Mammoth melting—Oregon Sugar pod—

Berries

Blueberries—wild and cultured
Strawberries—all
Cranberries
Blackberries
Raspberries Flowers Lilys
Corn Flower
SunFlower
Tulips
Daffadil
Cosmos
Vinca
Pot Marigolds Biopharmaceuticals Natural Biocompounds (Therapeutic Biocompounds Native to Plant Species):

The plants listed below express biocompounds native to them as secondary metabolites; genetic engineering of the plants is not involved.

| Plant | Compound | Indication | Drug |
|---|---|---|---|
| Madagarascar Rosy Periwinkle | Vincristine Vinblastine | Cancer Cancer Cancer Cancer Cancer | Vincristine Vinblastine Vinorelbine Vindesine Vinflunine |
| May Apple | Ajmalicine Podophyllotoxin | Hypertension Cancer Cancer Cancer Genita warts | Raubasine Etoposide Teniposide Etopophos Podophyllotoxin |
| English Yew | 10-DAB | Cancer | Docetaxel |
| *Artemisia* | Artemisinin | Malaria | Artemether |
| Poppy | Morphine | Pain Pain Erectile dysf. Parkinson's | Codeine Morphine Apomorphine Apomorphine |
| | Thebane | Pain | Oxycodone |
| Foxglove | Digitalis | Heart Disease | Digoxin |
| Indian Snakeroot | Reserpine Ajmalicine | Hypertension Hypertension | Reserpine Raubasine |
| Mex. Wild Yam | Diosgenin | Inflammation Hormonal Imbalance | Cortisone Progesterone Other steroids |

Vincristine is used to treat leukemia, non-Hodgkin's lymphoma (becoming more common as AIDS patients live longer), Kaposi's Sarcoma, breast and lung cancers and certain other cancers. Vinblastine has been used for tumor treatment, and is recommended for generalized Hodgkin's disease and resistant choricarcinoma. See Jordan, M. A. and Wilson, L., *Microtubules as a Target for Anticancer Drugs*, Nature Reviews, 4 (April 2004) 253.

Vinblastine and vincristine used in combination chemotherapy has resulted in 80% remission in Hodgkin's disease, 99% remission in acute lymphocitic leukemia, 80% remission in Wilm's tumor, 70% remission in gestational choricarcinoma, and 50% remission in Burkitt's lymphoma. (See O'Reilly et al, National Tropical Botanical Garden website, Kalaheo, Hi. (www.ntbg.org)).

Transgenic or recombinant biopharmaceuticals, i.e., therapeutic biocompounds from foreign DNA inserted in a plant host such as tobacco, safflower and alfalfa can also be produced using the invention.

Recombinant biopharmaceuticals encompass a wide range of therapeutic proteins and subunit vaccines, and include biogeneric or biosimilar compounds such as insulin, erythropoietin (EPO), human growth hormone (somatropin) (hGH) and granulocyte colony-stimulating factor (G-CSF).

Natural biocompound producing plants such as medical marijuana can be grown and cultivated to advantage using the invention. Growing such plants under controlled conditions possible with the invention can result in an increase in compound expression with better consistency of expression. Moreover, purer compounds can be extracted from the plants when using the invention due to the absence of contaminants such as pesticide residues and toxins from disease and insect, bird and animal excretia found in plants grown in the field, and often in greenhouse plants.

Upon harvesting the plants cultivated using the invention, the compounds of interest can be extracted and purified using various separation technologies such as steam distillation, solvent extraction, filtration and chromatography. Examples of extraction of natural product compounds are contained in King, M. B. & Boft, T. R., eds., *Extraction of Natural Prod-*

*ucts Using Near Critical Solvents*, Glasgow: Blackie Academic & Professional (1993). An example of a chromatography process for purifying proteins from transgenic tobacco is described by Holler, Vaughan and Zhang, *Polyethyleneimine Precipitation Versus Anion Exchange Chromatography in Fractionating Recombinant Glucuronidase from Transgenic Tobacco Extract*, Journal of Chromatography A, 1142 (2007) 98-105.

The ability to confine the entire system allows for minimal or no product loss from rodents or insects. Plants are less likely to contract viruses than on the ground. A controlled environment allows the plants to grow in a sterile atmosphere reducing bacterial and pest infestation without the use of poisons or other insecticides or fungicides.

The invention is especially useful is providing a local source of fresh vegetables and fruit with low capital investment. Shipping costs are minimized and use of the arrays is not restricted by region or growing season: any location with a supply of water and power is suitable. Plants can be grown in accelerated growing cycles to meet everyday food needs as well as specialized requirements for specific needs such as by nutraceutical companies. World hunger needs can be addressed locally and high quality seedlings can be grown locally or on site for reforestation purposes. The demand for organically grown products is also met not only for foods but also for nonfood products like cosmetics and like products.

The invention also offers environmental advantages such as reduced fossil fuel use in transporting product to market, energy efficiency, reduced and negligible nutrient pollution, elimination of the use of toxic pesticides and fertilizers, controlled and reduced water usage and the reuse of abandoned or idle facilities.

EXAMPLES

The following examples are not intended to limit or restrict the invention in any way. In each example, plants were grown using the vertical apparatus shown in the drawings and described herein.

Example 1

Spinach

Fertilizers

For seed germination "Thrivealive B1 Green" manufactured by Technaflora Plant Products LTD. 1533 Broadway Street. #125 Port Couuitlam BC. Canada. V3C 6P3 ph (604) 468 4769.

TAB1-G 1-1-1 was mixed at a rate of 2 ml/L water.

For Growing a two-part fertilizer. "Poura Vida" manufactured by Technaflora Plant Products.

Grow 6-4-3 and Bloom 2-6-6 were mixed at a rate of 4 parts Grow to 1 part Bloom. 25 ppm soluble iron was added to the final mixture.

Conditions for Seed Germination.

Light Cycle 16 hrON and 8/hr OFF; 12 T96 fluorescent tubes per light tray.

Carbon dioxide levels were set to 650 ppm.

Ambient air temperature was 16 C during lights ON and 14.5 C during lights OFF.

Humidity was kept at 65%.

Reverse Osmosis water was used for germinating the seedlings and watering.

Filtered city water was used for mixed fertilizer spraying.

Germination

Day 1. Seventy trays were planted. Seeds were planted into 1.25 in. by 2 in. peat pucks hydrated in R/O water with the pH adjusted to 6.3. The seeded pucks were then watered, covered with humidity lids. The plant trays were placed on a watering tray with the lights set to the highest level.

Day 2-4. Humidity lids were changed daily and removed on day 4.

Day 5-7. The plants were sprayed once a day with TAB1-G at a pH of 6.3.

Day 8-16. The plants were sprayed two times a day with Poura Vida fertilizer mix at 450 ppm at a ph of 6.5.

Vertical Planting

Day 17. The plants were placed in neoprene collars and transplanted into the 96 plant lids. The lids were place in watering trays in the vertical the farm. Four lids were placed on each of 11 levels.

Day 18-38. The plants were watered aeroponically by spraying under the lids for 5 seconds every 6 minutes with the Poura Vida fertilizer mixed at 700 ppm with a pH of 6.3.

Harvest

Seven cases of spinach were harvested per level. Each case contained six 150 g clamshell packages or about 13.8 lbs of spinach in total.

Example 2

Romaine Lettuce

Fertilizer

For seed germination "Thrivealive B1 Green" manufactured by Technaflora Plant Products. TAB1-G 1-1-1 mixed at a rate of 2 ml/L water. For Growing a two-part fertilizer. "Poura Vida" manufactured by Technaflora Plant products. Grow 6-4-3 and Bloom 2-6-6 mixed at a rate of 4 parts Grow to 1 part Bloom.

Conditions

Germination

Light Cycle16 hr ON and 8/hr OFF; 12 T96 fluorescent tubes per light tray.

No Carbon dioxide was used

Humidity 80%

In the Vertical Farm

Light Cycle 16 hr ON and 8/hr OFF

Carbon dioxide levels were set to 650 ppm.

Ambient air temperature was 1.6 C during lights ON and 14.5 C during lights OFF.

Humidity was kept at 65%.

Reverse Osmosis water was used for germinating the seedlings and watering.

Filtered city water was used for mixed fertilizer spraying.

Germination

Day 1. Thirty-two trays were planted. Seeds were planted into 1.25 in. by 2 in. peat pucks hydrated in R/O water with the pH adjusted to 5.8 the seeded pucks were then watered, covered with a humidity lid. The plant trays were placed on the watering tray with the lights set to the highest level.

Day 2-5. Humidity lids were changed daily and removed on day 5

Day 6-7. The plants were sprayed once a day with TAB1-G at a pH of 5.8

Day 8-16. The plants were sprayed two times a day with Poura Vida at 350 ppm at a ph of 5.8.

Vertical Planting

Day 17. The plants were placed in neoprene collars and transplanted into the 25 plant lids which were placed into the vertical farm with 4 lids on each of 11 levels.

Day 18-45. The plants were watered aeroponically by spraying under the lids for 5 seconds every 6 minutes with the Poura Vida fertilizer mixed at 700 ppm with a pH of 5.8.

Harvest

Twenty-five pounds of romaine lettuce were harvested from each level.

While this invention has been described as having preferred sequences, ranges, steps, materials, structures, features, and/or designs, it is understood that it is capable of further modifications, uses and/or adaptations of the invention following in general the principle of the invention, and including such departures from the present disclosure as those come within the known or customary practice in the art to which the invention pertains, and as may be applied to the central features hereinbefore set forth, and fall within the scope of the invention and of the limits of the appended claims.

What is claimed is:

1. A method for growing plants in vertical stacks, comprising:
    a) providing vertically stacked horizontal pairs P of plant platforms with inverted light trays resting thereon, each light tray carrying growth promoting light sources;
    b) vertically raising the uppermost light tray a desired growing distance S above the uppermost plant platform;
    c) vertically raising the uppermost plant platform with the next-below light tray suspended thereunder a desired growing distance S above the next upper platform;
    d) repeating step c) in succession whereby a series of platforms with light trays suspended thereunder are vertically suspended and spaced a desired growing distance S from each other;
    e) adjusting the growing distance S to accommodate plant growth without re-suspending the plant platforms by adjustably suspending the uppermost light tray and adjustably suspending the lower light trays from the plant platforms;
    f) placing watering trays on each suspended plant platform;
    g) placing plants to be grown on suspended watering trays under said light trays;
    h) regulating said light sources during periods of plant growth and non-growth;
    i) supplying water to said plants;
    j) removing grown plants from said watering trays; and
    k) lowering each plant platform-light tray pair in succession after grown plants are removed whereby said pairs are vertically re-stacked.

2. The method of claim 1, wherein the plants to be grown are carried by apertured plant lids placed on the watering trays and are watered aeroponically.

3. The method of claim 1, wherein plants to be grown are carried on perforated plant trays placed on each watering tray.

4. The method of claim 1, wherein the watering trays are raised and lowered in sequence at a work station in which plants are inserted and removed.

5. A vertical apparatus for growing plants, comprising:
    a) a plurality of vertically stacked pairs P of plant platforms with inverted light trays resting thereon, each light tray carrying a growth promoting light source;
    b) means to vertically raise the uppermost light tray a desired growing distance S above the uppermost plant platform;
    c) means to vertically raise, in succession, the uppermost plant platform and each next below plant platform, each with the next-below light tray suspended thereunder, a desired growing distance S whereby a series of plant platforms with light trays suspended thereunder are vertically suspended and spaced a desired growing distance S from each other;
    d) means to adjust the growing distance S to accommodate plant growth without re-suspending plant platforms by adjustably suspending the uppermost light tray from the means to vertically raise the uppermost light tray and adjustably suspending successively lower light trays from the plant platforms; and
    e) means to lower each pair P in succession whereby said pairs are vertically re-stacked.

6. The apparatus of claim 5, including means to place plants to be grown on suspended plant platforms under said light trays.

7. The apparatus of claim 6, wherein the plants to be grown are carried by apertured plant lids placed on watering trays carried by the plant platforms.

8. The apparatus of claim 7, wherein means are provided to water the plants aeroponically.

9. The apparatus of claim 5, wherein plants to be grown are carried by perforated plant trays placed on watering trays carried by the plant platforms.

10. The apparatus of claim 9, wherein means are provided to supply water to the watering trays for plant growth.

11. The apparatus of claim 5, including means to regulate said light sources during periods of plant growth and non-growth.

12. The apparatus of claim 5, wherein means are provided to raise and lower the pairs P in sequence at a work station in which plants are inserted and removed.

* * * * *